United States Patent [19]
Polendo-Loredo

[11] Patent Number: 4,756,894
[45] Date of Patent: Jul. 12, 1988

[54] PROCESS FOR THE OBTAINMENT OF BORIC ACID FROM COLEMANITE AND/OR HOWLITE MINERALS

[75] Inventor: Jose Polendo-Loredo, Monterrey, Mexico

[73] Assignee: Materias Primas Magdalena S.A.DE C.V., Monterrey, Mexico

[21] Appl. No.: 8,525

[22] Filed: Jan. 29, 1987

[30] Foreign Application Priority Data

Jan. 29, 1986 [MX] Mexico .................. 1389

[51] Int. Cl.$^4$ .................................. C01B 35/12
[52] U.S. Cl. .................................. 423/280; 75/2; 423/277; 423/283
[58] Field of Search .................. 423/280, 283, 277; 75/2

[56] References Cited

U.S. PATENT DOCUMENTS

| | | | |
|---|---|---|---|
| 289,836 | 12/1883 | Hobson | 423/283 |
| 1,927,013 | 9/1933 | Cramer et al. | 423/283 |
| 2,855,276 | 10/1958 | May et al. | 423/283 |

FOREIGN PATENT DOCUMENTS

| | | | |
|---|---|---|---|
| 2454409 | 5/1975 | Fed. Rep. of Germany | 423/283 |
| 915191 | 1/1963 | United Kingdom | 423/283 |

*Primary Examiner*—Patrick P. Garvin
*Attorney, Agent, or Firm*—Abelman Frayne Rezac & Schwab

[57] ABSTRACT

Improved process for obtaining boric acid from colemanite and/or howlite minerals basically comprising the stages of: treating the mineral with sulfuric acid to dissolve boron compounds; separating a solution thus formed from the solids in suspension; reacting said solution with hydrogen sulfide to precipitate arsenic and iron impurities precipitated from the remaining solution; cooling the remaining solution to precipitate boric acid; and separating the boric acid from the formed suspension. The liquor produced is free from impurities and before cooling can be recycled to the stage where the mineral is treated with sulfuric acid in order to concentrate the mineral. Likewise, the liquor obtained after precipitation of boric acid can also be recycled to said stage in order to concentrate the solution.

13 Claims, 3 Drawing Sheets

PROCESS FOR THE OBTAINMENT OF BORIC ACID FROM COLEMANITE AND/OR HOWLITE MINERALS

Improved process for the obtainment of boric acid from colemanite and/or howlite minerals basically comprising the stages of: treating the mineral with sulfuric acid to dissolve boron compounds; separating a solution thus formed from the solids in suspension; reacting said solution with hydrogen sulfide to precipitate arsenic and iron impurities precipitated from the remaining solution; cooling the remaining solution to precipitate boric acid; and separating the boric acid from the formed suspension. The liquor produced is free from impurities and before cooling can be recycled to the stage where the mineral is treated with sulfuric acid in order to concentrate the mineral. Likewise, the liquor obtained after precipitation of boric acid can also be recycled to said stage in order to concentrate the solution.

As an embodiment of the invention, after the precipitation of boric acid, the liquor obtained can be treated with calcium hydroxide in order to recover a colemanite beneficiated with calcium borate. The remaining solution from the beneficiated colemanite can be recycled to the stage of reaction with sulfuric acid.

Another embodiment comprises reacting the liquor obtained from the boric acid precipitation with ammonia, in order to precipitate the aluminum impurities, so as to carry out the precipitation of beneficiated colemanite as calcium borate, and the remaining solution from the last stage can be evaporated and condensed in order to separate the ammonia which is recovered in order to be reused. Finally, the condensate formed in the vapor condensate state, can be recycled to the stage of treating the mineral with sulfuric acid.

FIELD OF INVENTION

The present invention refers to an improved process for the preparation of boric acid from colemanite and/or howlite minerals, and, more particularly, the invention is related to a process for beneficating colemanite ($2CaO.3B_2O_3.5H_2O$) and/or howlite ($4CaO.5B_2O_3.2SiO_2 5H_2O$) in order to obtain boric acid, which in turn is used as a source of $B_2O_3$ for the manufacture of glass, ceramics, refractories, etc., principally as flux.

BACKGROUND OF THE INVENTION

A multiplicity of processes to obtain boron compounds are well known in the art, particularly boric acid, from materials containing boron, such as colemanite and/or howlite minerals, as well as other minerals containing borax. Among the processes which can be mentioned is that described by Taylor, U.S. Pat. No. 2,746,841, granted to Broax Consolidated, Ltd. and issued on May 22, 1956. In that process a mineral containing insoluble minerals and borax ($Na_2Bhd\ 40\ _7.10-H_2O$) together with a mother liquor obtained from the process used for dissolving borax are introduced into a dissolving tank, and the borate solution is separated from the insoluble fraction of the mineral in order to take the clear solution to a sulfate reactor. The solution is treated with sulfuric acid so as to convert all of the sodium oxide in the solution to sodium sulfate, thus producing an acid solution containing, primarily, sodium sulfate and boric acid. The acidified solution is heated so that the concentration of sodium sulfate exceeds the solubility of normal saturation at the existing temperature in order to precipitate anhydrous sodium sulfate. The precipitate is separated from the solution and washed so that it can be sold as pure sodium sulfate. The remaining solution, saturated with sodium sulfate and containing boric acid in elevated concentrations but not reaching saturation, is cooled or is concentrated and then cooled; this increases the solubility of the sulfate and boric acid is precipitated by crystallization from the cooled solution. The resulting crystals are separated from the solution and the boric acid thus crystallized is obtained as a product of the process. The remaining solution, which still contains sodium sulfate and boric acid in sufficiently high amounts to produce saturation, is returned as mother liquor to the mineral dissolving tank so that the dissolution stage can take place.

Another process known for obtaining boric acid is that described and claimed by Dwyer in the U.S. Pat. No. 3,103,412 issued Sept. 10, 1963, assigned to Tholand, Inc. In that method minerals containing calcium borate, such as colemanite and howlite are treated to recover useful boron compounds from said minerals. The process comprises: mixing the mineral with aqueous ammonium sulfate; heating the mixture to produce an ammonium pentaborate mud, precipitated calcium sulfate and gangue; filtering the mud to separate calcium sulfate and the gangue; cooling the filtrate in order to crystallize the ammonium pentaborate; separating the crystalline pentaborate and reacting it with sulfuric acid in order to form boric acid and ammonium sulfate. The boric acid is recovered as a reaction product and the ammonium sulfate solution thus formed is used to treat additional amounts of mineral.

Still another process to obtain boric acid from colemanite is that described by Mathis, Pierre (Solvay et Cie.) German Publication No. 2,020,570, dated Nov. 12, 1970, in which boric acid is prepared through the decomposition of crude or calcined colemanite with $CO_2$ at a pressure higher than atmospheric pressure and at moderate temperatures in the presence of water to separate the solid phase from the liquid phase, and crystallize boric acid from said liquid phase.

Another process to obtain boric acid through the decomposition of colemanite is described by Bozadzhiev, P. (Bulgarian), God Vissh Khim-Tekhnol Inst. Sofia, 1973, 21 (2), 79–84 which comprises producing boric acid by decomposition of the colemanite with monocalcic phosphate and double superphosphate. Decomposition percentages of 99.9% have been reported with said monocalcic phosphate and 98.1% with the double superphosphate.

Another process for the decomposition of colemanite is that one described by Bozadzhiev, P. (Bulgarian) God, Vissh Khim-Tekhnol Inst. Sofia. 1973 21 (2), 67–77 in which the colemanite is decomposed in the presence of an excess of phosphoric acid, through the reaction of colemanite with 15% phosphoric acid, by which a practically quantitative decomposition, within 60 minutes at a low temperature or 20 minutes at a higher temperature, is achieved. The velocity of decomposition is controlled by diffusion so that a layer of the diffusion consists of virtually pure boric acid, while starting from colemanite, monocalcium phosphate is formed.

Another process to obtain boric acid starting from minerals containing calcium, sodium and boron, such as ulexite, is described by Werner Janik et al in the Polish Pat. No. 218,576, issued Sept. 26, 1979 appearing in German publication No. 3,029,349, issued on Apr. 16, 1981. It includes the manufacture of boric acid from Peruvian ulexite by heating said ulexite in 96% sulfuric acid in an amount sufficient to precipitate calcium sulfate, resulting in a suspension of calcium sulfate in a solution of boric acid plus other secondary products. The calcium sulfate is separated from the solution and is then treated with ion exchange apparatus in order to obtain the boric acid by acidification, crystallization and purification.

Finally, another process is known to obtain boric acid from minerals such as Kernite. This method is described by Miroslav Novak et al in the Czechoslovakian Pat. No. 184,560, dated Feb. 15, 1981. With this method, 74 to 83% of the total $B_2O_3$ contained in the kernite mineral or in the borax is recuperated through the decomposition of such minerals with diluted nitric acid at a relatively elevated temperature and the separation of the crude boric acid from the cooled solution. The mother liquors are concentrated to produce additional boric acid and the residual liquid phase is evaporated to give a fertilizer containing sodium nitrate and boric acid.

However, all of the processes described above and others of the previous art, require, to be carried out the use of a mineral of a high grade or quality and of low degree of contamination, particularly of a low arsenic, iron and aluminum contamination since, otherwise, the resulting products would be contaminated by the stated impurities.

There are large amounts of colemanite and howlite mineral deposits of a low grade or quality and which are highly contaminated. Man has searched a long time for a way to exploit the stated deposits even though to date it has not been possible in view of the fact that all of the existing processes in the prior art were unable to beneficiate the stated minerals with reasonable efficiency. Therefore, for a long time an economic and efficient process has been sought for in order to beneficiate these types of minerals of low grade and high degree of contamination.

Even though numerous investigations have been carried out in order to exploit the stated minerals whether by the concentration, or the beneficiating methods, including the elimination of arsenic, iron and sulfate in order to obtain a boric acid useful for the glass industry, the processes that have been tried to data using this particular method have not been entirely satisfactory. Such process have included mechanical methods, such as mills, attrition, flotation, etc., as well as chemicals methods, such as the process of lixiviation, extraction by solvents or calcination. but even with all the processes that have been tried up to now, it has been found that a mineral is produced which is more or less concentrated and beneficiated with an average yield rate of 38 to 48% of $B_2O_3$ and with a relatively high recuperation rate of from 68 to 74%. These processes have not been sufficiently economical to try on an industrial scale, and they are incapable of adequately eliminating the arsenic, iron and aluminum contaminants contained in the minerals.

OBJECTIVES OF THE INVENTION

Having in mind the defects of the existing processes in the prior art, it is an object of the present invention to provide a process for the preparation of boric acid from colemanite and/or howlite minerals which can be economic, which can utilize low grade minerals having a high content of impurities, and which has a high degree of efficiency.

Another object of the present invention is to provide a process for obtaining boric acid from colemanite and howlite minerals, of the previously described nature, which, through the use of solvent extraction stages, can be carried out economically and efficiently in order to eliminate the impurities contained in the starting minerals and obtain very pure products.

Another object of the present invention is to provide a process for obtaining boric acid from colemanite and/or howlite minerals which provides the means to obtain a high recuperation of the boron compounds contained in the starting mineral without the use of expensive process steps and reagents.

A more particular object of the present invention is to provide a process to obtain boric acid from colemanite and/or howlite minerals and of the type previously indicated, and which is capable of obtaining a beneficited mineral and also of obtaining boric acid of an adequate purity for use in the glass industry.

BRIEF SUMMARY OF THE INVENTION

The previously described objects, as well as others which are a consequence of the same, are preferably attained in the following manner:

In agreement with the preferred embodiment of the present invention, boric acid is produced from colemanite and/or howlite minerals through a process mainly comprising: treating the mineral with sulfuric acid to dissolve boron compounds; separating a solution thus formed, from the solids in suspension; reacting said solution with hydrogen sulfide to precipitate arsenic and iron impurities contained in the solution; separating the precipitated impurities from the remaining solution; cooling the remaining solution to precipitate the boric acid; and separating the boric acid from the formed suspension. The liquor produced is free from impurities and, before cooling, can be recycled to the stage of treating the mineral with sulfuric acid in order to concentrate the mineral. Likewise, the liquor obtained after precipitation of boric acid can also be recycled to said stage in order to concentrate the solution.

As another embodiment of the invention, after the precipitation of boric acid, the liquor obtained can be treated with calcium hydroxide in order to recover a colemanite beneficiated with calcium borate. The remaining solution from the beneficiated colemanite can be recycled to the stage of reaction with sulfuric acid.

Another equipment comprises: reacting the liquor obtained from the boric acid precipitation with ammonia in order to precipitate the aluminum impurities, so as to carry out the precipitation of beneficiated colemanite as calcium borate, and the remaining solution from the last stage can be evaporated and condensed in order to separate the ammonia which is recovered in order to be reused. Finally, the condensate formed in the vapor condensate stage, can be recycled to the stage of treating the mineral with sulfuric acid.

BRIEF DESCRIPTION OF DRAWINGS

The novel aspects which are considered typical of the present invention will be particularly set forth in the attached claims. However, the invention itself, both because of its organization as well as its method of operation, together with other objects and advantages of the same, will be better understood from the following description of specific embodiments, when it is read in relation to the attached drawings, wherein:

DETAILED DESCRIPTION

As is well known, there are enormous deposits of colemanite ($2Ca.3B_2O_3.5H_2O$) and/or howlite ($4CaO.5B_2O_3.2SiO_2.5H_2O$) which, to-date, have not been beneficiated because an adequate process did not exist for the concentration of these boron minerals, together with the elimination of the impurities contained in same, since the traditional processes, as was previously pointed out, were not capable of purifying low grade minerals having a high content of impurities.

Colemanite and howlite are minerals widely used as starting materials to obtain boric acid which in turn constitutes a source of boric oxide ($B_2O_3$) for the manufacture of glass, ceramic, refractories, as well as other similar products, as a flux. However, the use of boric oxide for these purposes depends on the quality of the boric oxide and on the amount of impurities contained therein, particularly those of arsenic, iron and aluminum.

In accordance with the present invention, a process is provided to obtain boric acid from colemanite and/or howlite minerals, by a solvent extraction process in order to produce, a colemanite which has an average of 38 to 40% of boric acid and with a surprisingly high recovery of 70 to 86%, from which a production of boric acid having a concentration from 92 to 96% and a recovery from 86 to 94% is obtained.

Typical colemanite and howlite minerals to be beneficiated in accordance with the present invention, are minerals reported to contain the following individual components:
$Ca_2B_6O_{11}.5H_2O$
$CaSO_4$
$CaCO_3$
$CaHAsO_4$
$Al_2O_3$
$MgCO_3$
$Na_2O_4$
$R_2O_3$ (R being = Fe, Cr, Ti, etc.)
$SiO_2$ insoluble
$H_2O$ in the form of humidity.

These minerals can vary considerably in concentration of the diverse components previously cited, constituting either minerals of a high purity, i.e., minerals containing high concentrations of borate $Ca_2B_6O_{11}.5H_2O$, as well as low amounts of impurities, particularly $Fe_2O_3$ $Al_2O_3$, and more particularly $CaHAsO_4$, and minerals of low grade, having lower contents of borate $Ca_2B_6O_{11}.5H_2O$ and high amounts of impurities of $Fe_2O_3$, $Al_2O_3$, particularly $CaHAsO_4$.

The process the present invention, even though it can be applied economically to the benefit of any type of colemanite or howlite mineral of the previously described composition, is particularly useful for application to low grade and high impurity minerals in order to obtain a considerably elevated recovery and also high yields of boric acid.

Figures 1, 2:
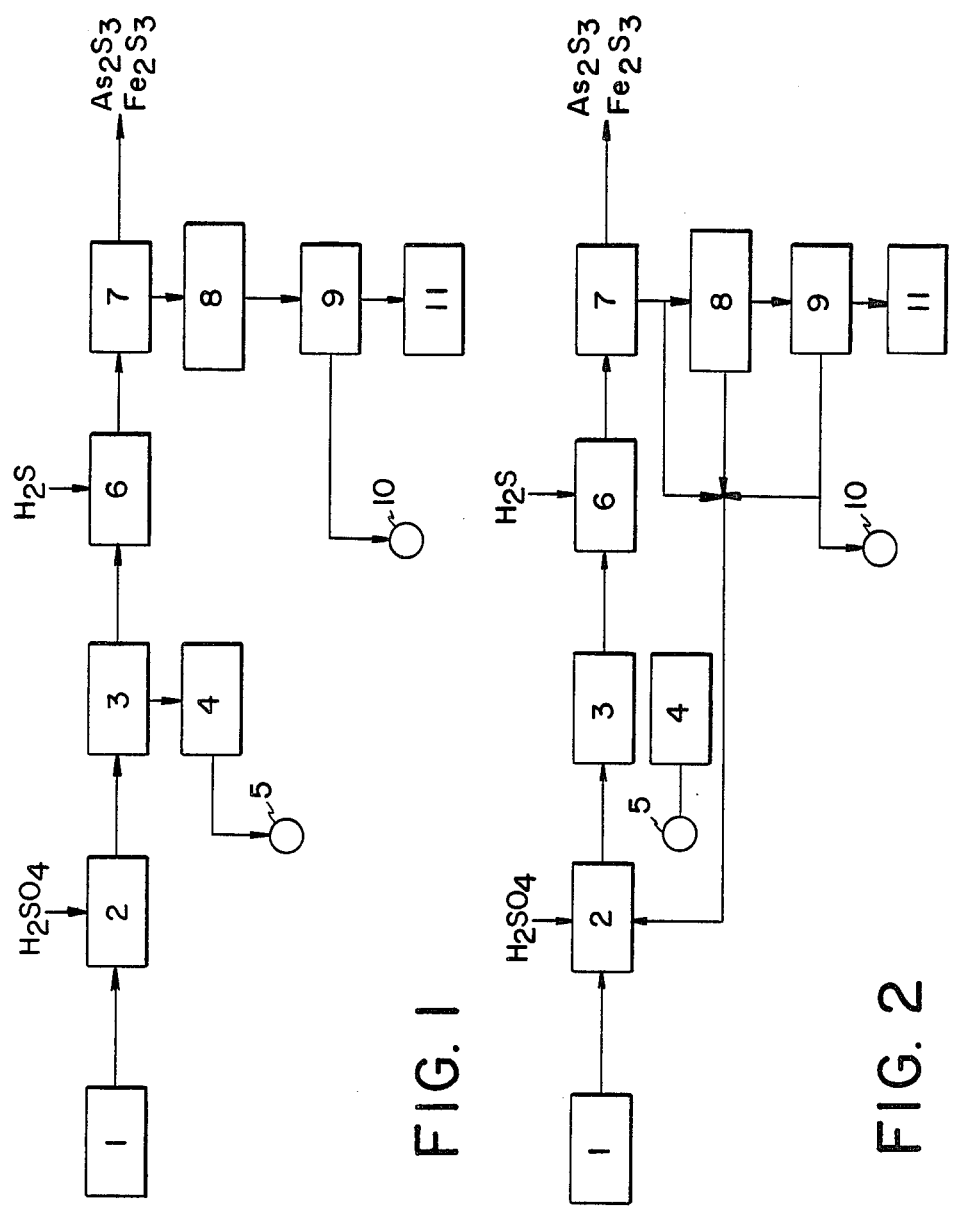
FIG. 1 is a flow diagram which illustrates the process for obtaining boric acid from colemanite or howlite minerals in accordance with an embodiment of the present invention.
FIG. 2 is a flow diagram which illustrates a second embodiment of the process illustrated in FIG. 1, wherein a recirculation of liquors to concentrate the mineral is included.

Now, referring particularly to the drawings, mainly to FIGS. 1 and 2, these shows a flow diagram which illustrates the fundamental process of the present invention. It is a process for obtaining boric acid from colemanite or howlite mineral through a solvent extraction process.

As is illustrated in FIG. 1 of the drawing, which shows the fundamental process for obtaining boric acid from colemanite or howlite mineral, said mineral is mixed in a mixer 1 with a predetermined amount of water and afterwards the suspension is sent to reactor 2 wherein it is reacted with sulfuric acid 1:3 in excess, at a temperature from about 85° to about 95° C., and the reaction mixture is heated to boiling. This causes the boron contained in the starting insoluble borate to be dissolved as boric acid and it remains as a solution in the suspension of the reaction.

In the reactor 2, taking into consideration the components of colemanite and howlite in the treatment, the following chemical reactions take place:

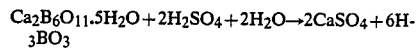

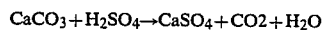

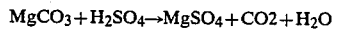

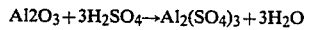

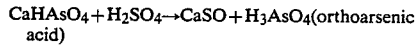

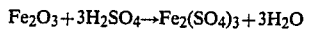

As can be seen from the above, the reaction that takes place in reactor 2 with sulfuric acid, forms a gangue or grey cake which is mainly composed of calcium sulfate, magnesium sulfate and other insoluble materials of gangue, and a solution containing mainly boric acid, orthoarsenic acid, ferric sulfate, jointly with some quantities of aluminum sulfate, when the colemanite or howlite have these types of impurities.

The suspension thus formed in reactor 2 is passed through a filter 3 wherein the grey cake 4 is separated and passed to waste disposal 5 and a filtrate containing water and the materials previously indicated in solution, is then passed to reactor 6, wherein gaseous hydrogen sulfide is injected into the previously cooled solution and filtered at a temperature of about 30° C. to 90° C. The reaction with the hydrogen sulfide precipitates the compounds of arsenic and iron in reactor 6, in accordance with the following equations:

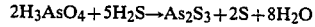

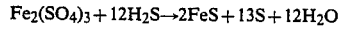

The suspension obtained in reactor 6 is passed through a filter 7 to separate a cake of arsenic sulfide and iron sulfide at a temperature of about 25° to 30° C. obtaining a filtrate practically free from arsenic and a reduced amount of iron, which, with or without a previous evaporation, is cooled at a temperature of approximately 23° to 28° C. in a crystallizer-cooler, in order to precipitate the boric acid crystals. Thereafter, the suspension is passed to a filter 9 wherein boric acid crystals are obtained. Said crystals are stored in a receptacle 11 and a filtered liquor is rejected.

As a preferred embodiment of the basic process of the present invention, it is preferred that the filtered liquor from filter 9 not be fully discarded. In fact just the opposite is preferred and in accordance with the process as clearly illustrated in the flow diagram of FIG. 2, at least one part of said liquor is sent for recycling to reactor 2 with sulfuric acid in order to concentrate the mineral.

Likewise and in accordance with what is clearly illustrated in FIG. 2, it is preferred to recycle the filtrate that comes from the arsenic and iron sulfide. It is also preferred to recycle the decanted liquor on the crystallizer 8, whether by mixing the three liquors together for recycling them to reactor 2, or through the recycling of one of them and not the others. The latter depends on what the user and designer of the process wants to choose, in accordance with the contents of sulfide ions which said liquors contain.

With these recycling stages shown in the process of the flow diagram of FIG. 2, the mineral can be concentrated to obtain a greater yield of boric acid crystals.

Figure 3:
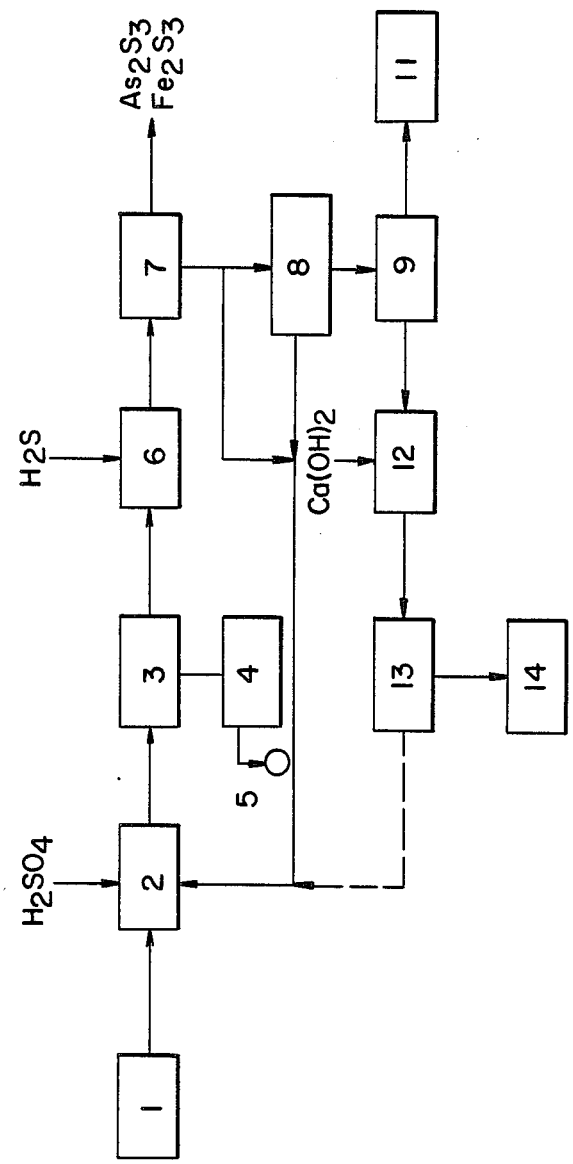
FIG. 3 is a flow diagram which illustrates a third embodiment of the present invention. In this embodiment, the obtaining of a beneficiated colemanite as calcium borate is included; and, FIG. 4, is another flow diagram, similar to the one illustrated in the FIG. 3, wherein the various stages of impurities recirculation and separation are illustrated.

In accordance with another embodiment of the present invention and in order to obtain a fuller recuperation of the boron compounds contained in the original mineral, the process of the present invention is undertaken through the use of the embodiment shown in the flow diagram of FIG. 3. The same shows the recycling of the filtered liquor that comes from the filter 7 separating arsenic and iron and from the decanted liquor on crystallizer 8 toward stage 2 of the sulfuric acid reaction. In this particular case the filtrate from filter 9, wherein the boric acid crystals 11 are separated but are not mixed with the other liquors, is not recycled directly, but said filtrate is made to react with calcium hydroxide at a temperature between 89° C. and 98° C. With this reaction the boron compounds contained in the calcium hydroxide solution are transferred into calcium borate. The following reactions take place in reactor 12 when the mixture is treated with hydrated lime.

$$Al_2(SO_4)_3 + 3Ca(OH)_2 \longrightarrow \underline{2Al(OH)_3} + 3CaSO_4$$

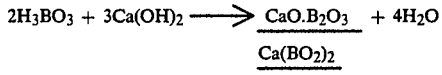
$$2H_3BO_3 + 3Ca(OH)_2 \longrightarrow \underline{CaO.B_2O_3} + 4H_2O$$
$$\underline{Ca(BO_2)_2}$$

$$MgSO_4 + Ca(OH)_2 \longrightarrow \underline{Mg(OH)_2} + CaSO_4$$

The suspension obtained in reactor 12, is made to pass through the proper filter 13. The latter separates a solid colemanite beneficiated as calcium borate which is stored in receptacle 14, as well as filtrate that has no boron compounds, i.e. it contains the remainder of boric acid and other soluble minerals. This filtrate can be discarded. Preferably, in accordance with that which is shown in the process of the flow diagram of FIG. 3, it can be mixed with the liquors obtained from filter 7 and from crystallizer 8 in order to be recycled to reactor 2 of the process, where it is used instead of water for the reaction with sulfuric acid. In this way the boric acid residues, which have remained dissolved in the filtrate obtained from filter 13, previously described, can be taken advantage of. Thus, the mineral is constantly present in concentrated form.

Through the use of the process shown in FIG. 3, a recuperation of reinforced boron compounds is obtained. In this way not only boric acid is recuperated, but also a beneficiated colemanite mineral as calcium borate at 14 is obtained. The latter can be the basic raw material for obtaining additional amounts of boric acid by reaction with sulfuric acid, in accordance with the process claimed and described in the pending patent application filed on this same data by the Applicant herein and named: "Improved Process for Beneficiating Colemanite and Howlite Minerals".

Since the colemanite beneficiated as calcium borate which is obtained in reactor 12 of the process of FIG. 3—in the case where the colemanite and/or howlite minerals contain high amounts of aluminum compounds—still remains impure because of the stated high amounts of aluminum compounds, and the remainder of the iron compounds that were not eliminated in reactor 7, it is preferred when employing minerals with high aluminum content to use an alternate process which is identical to the one already described and related to FIG. 3 of the drawings. However, this process introduces another stage to eliminate aluminum compounds in accordance with the flow diagram which is clearly shown in FIG. 4 of the drawings.

This flow diagram also shows the recycling of the liquors that come from reactor 7 which eliminates arsenic and from crystallizer 8 towards stage 2 of the treatment of the mineral with the sulfuric acid. This method treats separately the filtrate that comes from the boric acid crystals 11 separating the filter 9. It is done by sending said filtrate to reactor 15. Ammonia is injected into the reactor 15 either in a gaseous form as is illustrated in the flow diagram of the FIG. 4 or, in the form of ammonium hydroxide in order to react with the aluminum and iron compounds which contaminate the liquor that was filtered at filter 9, and which of course are derived from the original mineral used. Said reaction is preferably carried out at a high temperature of approximately 85° C. to 100° C., and later boiling the reaction mixture in order to precipitate the aluminum and iron hydroxides. The reactions which take place in reactor 15 are as follows:

$$Al_2(SO_4)_3 + 6NH_4OH \longrightarrow \underline{2Al(OH)_3} + 3(NH_4)_2SO_4$$

$$5H_3BO_3 + NH_4OH \longrightarrow NH_4B_5O_8 + 8H_2O$$

$$Fe_2(SO_4)_3 + 6NH_4OH \longrightarrow \underline{2Fe(OH)_3} + 3(NH_4)_2SO_4$$

The precipitates of aluminum and iron hydroxides are separated from the suspension in filter 16 and the filtrate of filter 16, which has the aluminum compounds and the iron compounds in the form of hydroxides, is then sent to the previously described reactor 12, as is shown in FIG. 3, where said filtrate is caused to react with calcium hydroxide in order to precipitate a beneficiated colemanite as calcium borate. Then the suspension is sent to filter 13, also previously described, in order to separate the beneficiated colemanite as calcium borate 14, and instead of sending said filtrate directly to reactor 2, it is first sent to a heater 18 which operates through the injection of vapor 19, thus obtaining a vapor condensate 20 in order to expel the ammonia from the solution. The ammonia is sent to separate 17, where the ammonia is expelled and is sent to reactor 15; meanwhile, the solution with the ammonia eliminated therefrom is recycled to reactor 2, where the mineral reacts with sulfuric acid.

Figure 4:
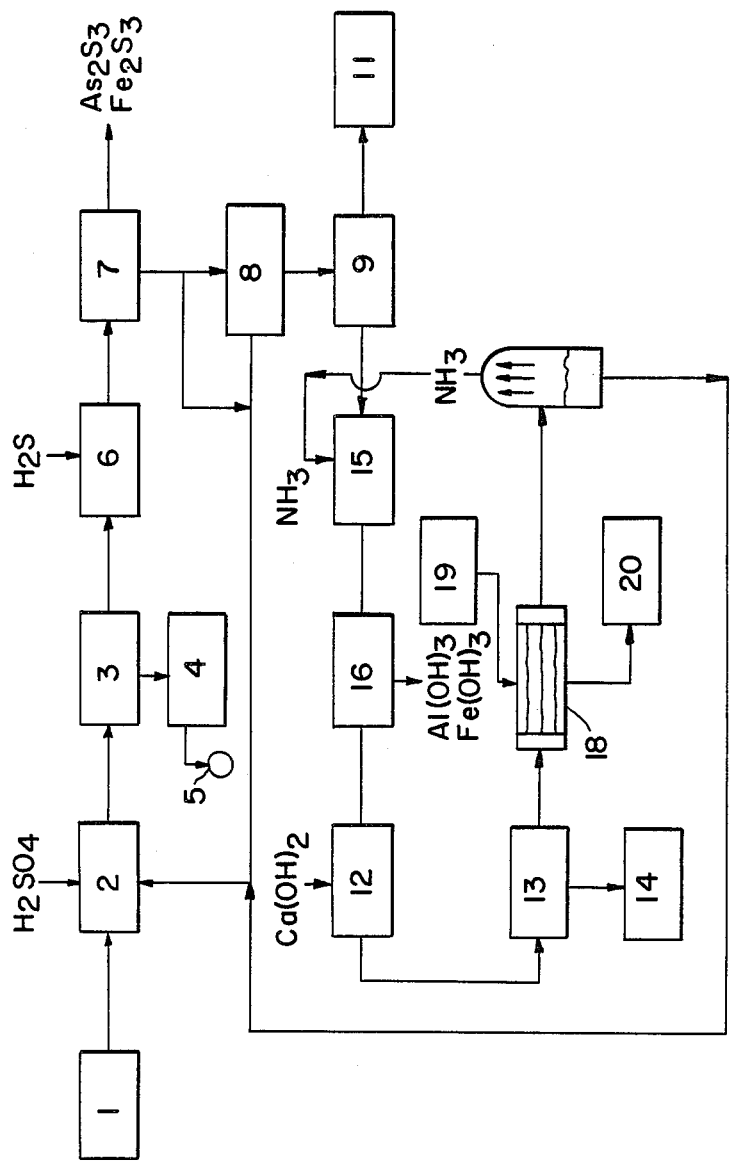

The process shown in the FIG. 4, therefore, besides achieving a considerable concentration of the mineral through the recycling of the liquors that come from filter 7, which separates the arsenic sulfide crystals, and from crystallizer 8, which separates the boric acid crystals, there is a maximum recuperation of the boron compounds contained in the original mineral 1, through the beneficiating of the colemanite contained in the liquors of the boric acid crystal separating 9, through the reaction with calcium hydroxide in order to obtain a beneficiated colemanite as calcium borate. The latter, in the particular case of the process carried out in accordance with the embodiment of FIG. 4, is a highly purified colemanite. This is so because before all of the compounds of aluminum and iron are eliminated through the reaction of the liquor with ammonia, as is shown in FIG. 4. In addition, the ammonia is recuperated by the claimed process and it is only diminished minimally. Only the natural losses of ammonia due to recirculation needs to be resupplied.

The present invention will be better understood by the following examples which, however, should not be taken as a limitation on the scope of the invention.

EXAMPLE 1

Obtaining of boric acid by direct crystallization without recirculation

To 100 grams of ground howlite mineral, 650 ml. of water at a temperature of 95° C. was added and afterwards 75 ml. of 1:3 diluted sulfuric acid was added slowly and with agitation until it reached its boiling point.

The reaction mixture was filtered while hot at a temperature of about 95° C. to obtain a grey cake of an insoluble magma having a weight of 178.5 grams and a filtrate having a volume of 650 ml.

To the abovementioned filtrate, hydrogen sulfide was injected at a temperature of about 28° C. to eliminate the arsenic and some of the iron compounds which was filtered to separate an arsenic sulfide cake at a temperature of 28° C.

The filtrate so obtained was concentrated by evaporation from a volume of 650 ml. of a volume of 150 ml. Thereafter, the filtrate was cooled from a temperature of 98° C. to 28° C. which was then filtered in order to precipitate the boric acid crystals.

The filtrate obtained was dried at 75° C. to obtain a concentrated boric acid with impurities.

The results obtained from the process of the above example were as follows:

| PRODUCT | AMOUNT | CONCEN-TRATION | GRAMS OF $H_3BO_3$ | YIELD |
|---|---|---|---|---|
| Colemanite | 100.0 g. | 29.69% | 29.69 g. | |
| Grey Cake | 84.0 g. | 1.21% | 1.02 g. | |

| PRODUCT | AMOUNT | CONCEN-TRATION | GRAMS OF $H_3BO_3$ | YIELD |
|---|---|---|---|---|
| Crystals | 24.85 g. | 84.0% | 20.87 g. | 70.29% |
| Concentrated | 20.14 g. | 34.19% | 6.88 g. | 23.17% |

The total yield of boric acid crystals obtained through the use of this process was 70.29%, which when added to the amount of boric acid remaining in the filtrate, resulted in an extraction coefficient of 83.46% being obtained. It is important to observe that the boric acid contained in the filtrate was scraped.

EXAMPLE 2

Obtaining Boric Acid and Beneficiated Colemanite without Recycling of Liquors

The process of example 1 was repeated, but instead of discarding the filtrate of boric acid crystals which was obtained, said filtrate was reacted with calcium hydroxide (lime slurry) in an volume of 42 ml. to a concentration of 361.2 g/liter of $Ca(OH)_2$.

With the previous reaction, a magma of calcium borate was precipitated and an additional amount of boric acid, in the form of calcium borate, that is, in the form of beneficiated colemanite as calcium borate. From the latter, additional boric acid was obtained through the dissolution of the beneficiated colemanite in 100 ml. of water at a temperature of 95° C. and the addition of 50 ml. of sulfuric acid 1:3. The mixture was heated to its boiling point. The suspension was filtered while hot in order to obtain a white cake which was washed with 50 ml. of water at a temperature of 95° C.

The results obtained from the above example are as follows:

The results obtained are:

| PRODUCT | AMOUNT | CONCEN-TRATION | GRAMS OF $H_3BO_3$ |
|---|---|---|---|
| Colemanite | 100.0 g. | 29.97% | 29.97 g. |
| Grey Cake | 84.0 g. | 1.27% | 1.06 g. |
| $As_2S_3$ Cake | 0.39 g. | 0.00% | 0.00 g. |
| $CaSO_4$ | 32.0 g. | 1.44% | 0.46 g. |
| Light Liquor | 700 ml. | 10.39 g/liter | 7.27 g. |
| Concentrated Liquor | 300 ml. | 70.09 g/liter | 21.03 g. |

The denomination "Light Liquor" refers to the liquor that was obtained after the beneficiated colemanite with calcium borate was filtered.

EXAMPLE 3

Obtaining Boric Acid and Beneficiated Colemanite as Calcium Borate, with recycling of Liquors The process of example 2 was repeated, but instead of discarding the light liquor obtained from the filtration of the beneficiated colemanite with calcium borate from the first extraction made in the process of example 2, 700 ml. of light liquor from the first extraction was obtained. Then 100 grams of howlite was added. The mixture was heated to its boiling point. Thereafter, 75 ml. of sulfuric acid (1:3) were added to the solution and the mixture was heated to its boiling point and was filtered while hot. The filtrate obtained was injected with gaseous sulfuric acid at a temperature of 30° C. in order to eliminate the arsenic. Thereafter, the solution was filtered to separate the precipitated arsenic sulfide.

To the filtrate obtained, 50 ml. of lime slurry having a concentration of 361.2 g/liter of Ca(OH)$_2$ was added. Then the solution was agitated to homogenize the reaction.

The solution was filtered in order to separate the precipitate with respect to the light liquor. The volume of said light liquid was 700 ml. The precipitate was dissolved with 100 ml. of water at 95° C. and 50 ml. of sulfuric acid was added in order to produce additional boric acid. The suspension was heated to a boil and was filtered while hot. Then a cake of calcium sulfate was obtained and it was washed with 50 ml. of water at 95° C.

From said filtration, a concentrated liquor of boric acid with a volume of 300 ml. was obtained.

The results obtained from the above example are as follows:

| PRODUCT | AMOUNT | CONCENTRATION | GRAMS OF H$_3$BO$_3$ |
| --- | --- | --- | --- |
| Colemanite | 100.0 g. | 30.0% | 30.0 g. |
| Grey Cake | 84.0 g. | 1.33% | 1.12 g. |
| As$_2$S$_3$ Cake | 0.40 g. | 0.00% | 0.00 g. |
| CaSO$_4$ | 32.0 g. | 1.44% | 0.46 g. |
| Recycled Liquor | 700.0 ml. | 10.39 g/liter | 7.27 g. |
| Light Liquor | 700.0 ml. | 15.02 g/liter | 10.51 g. |
| Concentrated Liquor | 300 ml. | 84.21 g/liter | 25.26 g. |

The total yield of boric acid obtained by the present process is 84.2%.

EXAMPLE 4

Obtaining Boric Acid without Evaporation of Liquors 100 grams of mill mineral were obtained and were suspended in 100 ml. of water at 95° C. Then 35 ml. of 10 normal sulfuric acid was slowly added. The mixture was agitated and 50 ml. of water were added at a temperature of 95° C. in order to dilute its paste-like consistency through agitation.

The suspension was heated to its boiling point and was filtered while hot to obtain a grey cake of insoluble magma which was washed with 50 ml. of water at 95° C.

However, when the solution was filtered, it was noted that in the filtrate the boric acid was crystallizing by reason that the solution was saturated. The volume obtained in the filtrate was 150 ml.

The filtrate was cooled from a temperature of 95° C. to 28° C. in order to crystallize the boric acid. The product obtained was filtered to separate the crystals, and a final filtrate of 145 ml. was obtained.

The results obtained from the above example are as follows:

| PRODUCT | AMOUNT | CONCENTRATION | GRAMS OF H$_3$BO$_3$ |
| --- | --- | --- | --- |
| Colemanite | 100.0 g. | 30.0% | 30.0 g. |
| Grey Cake | 79.20 g. | 5.93% | 4.71 g. |
| Crystals | 8.86 g. | 95.79% | 8.49 g. |
| Final Liquor | 145.0 ml. | 112.59 g/liter | 16.32 g. |

The percentage of boric acid obtained, including the crystals and the boric acid included in the final liquor was 82.70%. However, the yield of boric acid crystals obtained was only of 28.3% in accordance with the previous table.

EXAMPLE 5

Obtaining Boric Acid by Crystallization and with Recycling of Liquors (a) First Extraction:

To 100 grams of ground colemanite mineral, 500 ml. of water at 95° C. was added, forming a suspension and was mixed by agitation. Afterwards 73 ml. of 10 normal sulfuric acid were slowly added and the mixture was heated to reach the boiling point and was filtered while hot.

The liquor obtained was cooled from a temperature of 85° C. to 25° C. Then, the cool liquor was filtered to separate the saturated liquor from the boric acid crystals. The saturated liquor was heated and was prepared for the next extraction of boric acid.

(b) Second Extraction:

100 grams of colemanite mineral was suspended in the saturated liquor of the first extraction. Thereafter, 73 ml. of 10 normal sulfuric acid were slowly added to carry out the dissolution of the boron compounds. The mixture was heated to reach its boiling point and later the suspension was filtered while hot. From the filtering operation a grey cake of insoluble magma was obtained which was washed with 50 ml. of water at 95° C.

The liquor obtained was cooled from 85° C. to 25° C. The cooled liquor was filtered at 25° C. to separate the saturated liquor with respect to the boric acid crystals that were previously obtained.

The liquor obtained from the abovementioned filtrate was heated and later was prepared for its third boric acid extraction. From this liquor, a volume of 450 ml. was obtained.

(c) Third Extraction:

The liquor filtrate obtained from the last extraction was heated and, thereafter, 100 grams of colemanite and 73 ml. of 10 normal sulfuric acid were added. The suspension was heated to reach the boiling point and was filtered while hot in order to obtain a grey cake which was washed with 50 ml. of water at 95° C.

The liquor obtained was cooled from 85° C. to 25° C. The solution obtained was filtered at 25° C. in order to separate the saturated liquor with respect to the boric acid crystals previously obtained.

The 450 ml. of saturated liquor which was obtained by filtration, was then prepared for the next extraction.

(d) Fourth Extraction:

To 100 grams of colemanite mineral, the residual liquor from the third extraction was added. The mixture was homogenized and thereafter 73 ml. of 10 normal sulfuric acid was slowly added. The mixture was heated to reach its boiling point and suspension was filtered while hot in order to obtain a grey cake which was washed with 50 ml. of water at a temperature of 95° C.

The filtered liquor so obtained was cooled from 85° C. to 25° C. Later the solution was filtered at 25° C. to separate the boric acid crystals and the saturated liquor.

The volume obtained from said saturated liquor was 450 ml.

The results obtained from the process of the above example were as follows:

| PRODUCT | AMOUNT | CONCENTRATION OF $B_2O_3$ | GRAMS OF $B_2O_3$ | YIELDS OF CRYSTALS |
|---|---|---|---|---|
| I Extraction | | | | |
| Colemanite | 100.0 g. | 20.83% | 20.83 g. | |
| Grey Cake | 85.6 g. | 3.90% | 3.34 g. | |
| Crystals | 6.16 g. | 53.64% | 3.30 g. | 16.03% |
| II Extraction | | | | |
| Colemanite | 100.0 g. | 20.83% | 20.83 g. | |
| Grey Cake | 86.7 g. | 2.47% | 2.14 g. | |
| Crystals | 33.72 g. | 32.42% | 17.68 g. | 84.87% |
| III Extraction | | | | |
| Colemanite | 100.0 g. | 20.83% | 20.83 g. | |
| Grey Cake | 86.2 g. | 2.61% | 2.45 g. | |
| Crystals | 35.40 g. | 52.84% | 18.58 g. | 89.19% |
| IV Extraction | | | | |
| Colemanite | 100.0 g. | 20.83% | 20.83 g. | |
| Grey Cake | 87.1 g. | 2.49% | 2.17 g. | |
| Crystals | 35.83 g. | 52.08% | 18.66 g. | |
| Saturated Liquor | 450 ml. | 33.78 g/liter | 15.20 g. | 89.58% |

EXAMPLE 6

Obtaining Boric Acid and Beneficiated Colemanite as Calcium Borate with Recycling of Liquors (a) First Extraction To 100 grams of ground colemanite mineral, 500 ml. of water were added at a temperature of 95° C. and thereafter the solution was mixed. A sufficient amount of sulfuric acid was slowly added in order to lightly acidify the solution to a pH of 6. 60 ml of 10 normal sulfuric acid was needed.

The reaction mixture was heated to boiling and later was filtered while hot in order to obtain a grey cake that was dried, as well as a solution of boric acid liquor in a volume of 550 ml. Later, said liquor was prepared to be recycled in the next extraction.

(b) Second Extraction

To the liquor obtained from the first extraction, 100 grams of colemanite mineral was added. Later 60 ml. of 10 normal sulfuric acid were added to the suspension. The suspension was heated to reach boiling and later the suspension was filtered while hot. From the filtering operation a grey cake was washed with 50 ml. of water at a temperature of 95° C. and later was dried. A liquor having a volume of 600 ml. was obtained, which was heated to boiling and prepared for the next extraction.

(c) Third Extraction

To the hot liquor obtained from the second extraction, 100 grams of colemanite mineral were added and mixed to form a suspension. To the abovementioned suspension, 60 ml. of 10 normal sulfuric acid were added and the mixture was heated to reach boiling and later the suspension was filtered while hot. From the filtering operation, a grey cake was obtained which was washed with 50 ml. of water at a temperature of 95° C. and later was dried. From this solution 650 ml. of boric acid liquor at a temperature of 80° C. was obtained.

(d) Elimination of Arsenic

To the hot liquor solution obtained from the third extraction, a flow of gaseous hydrogen sulfide was injected to precipitate the arsenic. An excess amount of hydrogen sulfide was injected.

The suspension was filtered while hot in order to separate the cake of arsenic sulfide which was precipitated. Also, the boric acid precipitation of the saturated liquor was avoided. The cake of arsenic sulfide so obtained was separated and later was dried.

(e) Obtaining Crystals of Boric Acid

The filtered solution obtained was heated to expel the excess of hydrogen sulfide solution. Later the solution was cooled from a temperature of 95° C. to 28° C. and a volume of 650 ml. was obtained. Thus, boric acid crystals were formed.

The saturated solution was filtered in order to obtain the boric acid crystals and a saturated liquor at a temperature of 16° C. The boric acid crystals were dried and the filtrate obtained, in a volume of 540 ml., was heated. Thereafter, it was sent to the next stage in order to obtain a beneficiated colemanite as calcium borate. Through the use of said stage the extraction of the boron compounds of the original mineral was completed.

(f) Obtaining Beneficiated Colemanite as Calcium Borate

The 540 ml. of filtrate obtained from the crystallization stage were heated and 100 ml. of lime slurry, with a concentration of 213 grams/liter of $Ca(OH)_2$, was added to the filtrate. The solution was heated to effect the reaction at a temperature of 98° C. Thereafter, the solution was left to repose to digest the reaction.

The solution was filtered while cool to separate the precipitated borate sludges from the clear liquor. 450 ml. of a diluted liquor was obtained, as well as 188.4 grams of a beneficiated colemanite as humid calcium borate. Later, the mixture was dried in order to obtain the final product.

The results obtained from the above example are as follows:

| PRODUCTS | CONCENTRATION | GRAMS OF $H_3BO_3$ | TOTAL GRAMS OF $H_3BO_3$ |
|---|---|---|---|
| (I) 100 g. Colemanite | 29.00% | 29.00 g. | |
| (II) 100 g. Colemanite | 29.00% | 29.00 g. | |
| (III) 100 g. Colemanite | 29.00% | 29.00 g. | 87.0 g. input |
| (I) 86.4 g. Grey cake | — | 1.34 g. | |

-continued

| PRODUCTS | CONCENTRATION | GRAMS OF $H_3BO_3$ | TOTAL GRAMS OF $H_3BO_3$ |
|---|---|---|---|
| (II) 86.4 g. Grey cake | — | 2.12 g. | |
| (III) 86.4 g. Grey cake | — | 1.21 g. | |
| (IV) 0.41 g. $As_2O_3$ cake | 0.00% | 0.00 g. | |
| (V) 435 ml. Final Filtrate | 5.70 g/l. | 2.43 g. | 7.15 g. lost 8.22% |
| (VI) 6.15 Crystals | 94.83% | 58.32 g. | 58.32 g. recovered 67.03% |
| (VII) 52.09 g. Beneficiated Colemanite | 41.33% | 21.53 g. | 21.53 g. recovered 24.75% |

The yield of crystals obtained through the process provided by this example was 67.03%, while the yield of boron compounds as beneficiated colemanite as calcium borate was 24.75%. The total yield of recuperated boron compounds of this example was 91.78%.

EXAMPLE 7

Obtaining Boric Acid and Beneficiated Colemanite as Calcium Borate with elimination of aluminum impurities (a) First Extraction:

To 100 grams of ground colemanite mineral, 45 ml. of water at 95° C. were added forming a suspension. Afterwards, 60 ml. of 10 normal sulfuric acid were slowly added. The mixture was heated to reach the boiling point and later the suspension was filtered while hot. From the filtering operation a grey cake was obtained which was washed with 50 ml. of water at a temperature of 95° C., obtaining a volume of filtrate of 550 ml. at a temperature of 80° C. Said filtrate was heated and was prepared for the next extraction.

(b) Second Extraction:

To 100 grams of ground colemanite from the filtrate obtained in the first extraction, 60 ml. of 10 normal sulfuric acid were slowly added. The mixture was heated to reach boiling, and later was filtered while hot. From the filtering operation a grey cake was obtained which was washed with 50 ml. of water at a temperature of 95° C., as well as 600 ml. of filtrate at a temperature of 85° C. which was heated and prepared for the following extraction.

(c) Third Extraction:

To 100 grams of ground colemanite from the filtrate obtained in the second extraction, 60 ml. of 10 normal sulfuric acid were slowly added. The mixture was heated to reach boiling, and later was filtered while hot. From the filtering operation a grey cake was obtained, which was washed with 50 ml. of water at a temperature of 95° C., as well as 650 ml. of a filtrate which was heated at a temperature of 83° C. and prepared for the elimination of arsenic.

(d) Elimination or Arsenic

To the 650 ml. of the filtrate obtained from the third extraction, gaseous hydrogen sulfide was injected at a temperature of 90° C. An excess of hydrogen sulfide was employed obtaining a precipitate of arsenic sulfide, and later the suspension was filtered, but prior to filtering the suspension it was heated in order to eliminate the excess of hydrogen sulfide.

(e) Crystallization of Boric Acid 650 ml. of the filtrate solution obtained from the previous stage was cooled from a temperature of 95° C. to 28° C. to precipitate boric acid crystals. While maintaining the concentrated solution of boric acid at a temperature of 28° C., said solution was filtered to separate the crystals which were dried. The 550 ml. of filtrate obtained was heated and later was prepared for treatment with ammonium hydroxide in order to eliminate the aluminum.

(f) Precipitation of Aluminum Hydroxide

To the filtered solution obtained from the prior stage at a temperature of 95° C., ammonium hydroxide was added drop-by-drop until the solution was neutralized at a pH of 7. In said reaction 5 ml. of ammonium hydroxide was consumed. Next the solution was heated for 1 minute in order to get rid of the excess ammonia and, thereafter, the solution was decanted and filtered in order to precipitate all of the aluminum hydroxide. The filtered volume obtained was 500 ml. and the liquor was prepared for the following stage.

(g) Obtaining Beneficiated Colemanite as Calcium Borate

The 500 ml. of final liquor obtained from the filtration of aluminum hydroxide were heated to reach its boiling point and 100 ml. of lime slurry with a concentration of 240.8 grams/liter of $Ca(OH)_2$ was added. The mixture was mixed and heated for 1 minute. The minute was allowed to repose for 15 minutes in order to digest the reaction. Later the suspension was filtered in order to separate the beneficiated colemanite with calcium borate. 187.6 grams of beneficiated colemanite and 450 ml. of filtrate were obtained.

The results obtained from the above example is as follows:

| PRODUCTS | AMOUNT | CONCENTRATION $H_3BO_3$ | GRAMS OF $H_3BO_3$ |
|---|---|---|---|
| Grey cake I | 86.4 g. | 1.33% | 1.15 g. |
| Grey cake II | 86.4 g. | 1.33% | 1.15 g. |
| Grey cake III | 86.4 g. | 1.33% | 1.15 g. |
| $As_2S_3$ cake | 0.41 g. | 0.00% | 0.00 g. |
| Final Filtered | 450 ml. | 4.49 g/liter | 2.02 g. |
| Crystals | 52.20 g. | 98.11% | 51.21 g. |
| Beneficiated Colemanite | 54.77 g. | 54.34% | 29.76 g. |
| $Al(OH)_3$ cake | 1.07 g. | 0.00% | 0.00 g. |

The yield of crystals obtained through the process provided by this example was 58.86%, while the yield of beneficiated colemanite as calcium borate was 34.20%. The total yield of the boron compounds by this example was 93.06%.

From the above it can be seen that a new process has been provided for obtaining boric acid from colemanite and/or howlite minerals. The process is suitable for the beneficiation of minerals having a low content of boron compounds and a high content of arsenic, iron and aluminum impurities so as to obtain boric acid crystals of a high purity, with high recuperation percentages which can be from 75 to 95% with respect to original boron content of the original mineral. All of which can be carried out by process stages which are very simple and economical and which allows for the possibility of exploitation of colemanite and/or howlite minerals which, up to now, had been impossible to exploit through the use of traditional processes. Thus, this method greatly contributes to boric oxide production, starting from the boric acid thus obtained, particularly for utilization in the glass industry. This is so because colemanite and howlite mineral deposits, having a poor degree of concentration and a high degree of contamination, are very large and abundant.

The present invention results in simultaneously obtaining boric acid in crystal form and a beneficiated colemanite as calcium borate, which makes possible the obtaining of boric acid in high amounts and superior yields. As is shown in the process, the beneficiated colemanite as calcium borate is easily transformed to boric acid by its reaction with sulfuric acid. Then through the use of the present process, the yield of boric acid crystals obtained from low grade minerals is increased.

As has been demonstrated, the advantages of the present invention are considerable and evident. Those skilled in the art can confirm the results obtained in the previous examples.

Even though the above has been shown and described with respect to various embodiments of the present invention, it must be pointed out that numerous modifications to said embodiments are possible. Therefore, the present invention must not be considered to be restrictive, except with respect to that which is required by the mentioned technology and by the scope of the attached claims.

I claim:

1. A process for obtaining boric acid from colemanite minerals, howlite minerals, or mixtures thereof, comprising: treating the mineral with sulfuric acid to dissolve boron compounds; separating the solution thus formed from the insoluble solids in suspension; reacting said solution with hydrogen sulfide to precipitate arsenic and iron impurities; separating the impurities precipitated from the remaining solution; cooling the remaining solution to precipitate boric acid; and separating the boric acid from the remaining solution.

2. The process as claimed in claim 1 wherein the remaining solution is recycled at least one time to the stage of treating the mineral with sulfuric acid to increase the concentration before the cooling stage.

3. The process as claimed in claim 1 wherein the remaining solution and the precipitated boric acid are recycled at least one time to the stage of treating the mineral with sulfuric acid to increase the concentration before the separation stage.

4. The process as claimed in claim 1 wherein the remaining solution after the separation of boric acid is reacted with calcium hydroxide in order to recover a mineral beneficiated as calcium borate which is precipitated and separated from the remaining solution.

5. The process as claimed in claim 4, wherein the remaining solution after the separation of beneficiated colemanite is recycled to the stage of treating the mineral with sulfuric acid.

6. The process as claimed in claim 1 wherein the remaining solution after precipitating boric acid is reacted with ammonia in order to precipitate the aluminium impurities which are separated and discharged from the remaining solution and thereafter the solution is made to react with calcium hydroxide in order to recover a beneficiated mineral as calcium borate which is precipitated and separated from the remaining solution.

7. The process as claimed in claim 6 wherein the remaining solution after the separation of the beneficiated mineral is evaporated and condensed to recover the gaseous ammonia which is recycled to the stage of reaction with ammonia.

8. The process as claimed in claim 7, wherein the condensate of the vapor condensate stage is recycled to the stage of treating the mineral with sulfuric acid.

9. The process as claimed in claim 1 wherein the reaction of the mineral with sulfuric acid is carried out at a temperature between about 85° C. and the boiling point of the reaction mixture.

10. The process as claimed in claim 1 wherein the reaction of the filtrate from the first stage with hydrogen sulfide is carried out at a temperature between about 23° C. and about 40° C.

11. The process as claimed in claim 6 wherein the reaction with ammonia to separate the impurities of aluminum, is carried out at a temperature between about 95° C. and the boiling point of the reaction mixture.

12. The process as claimed in claim 4, wherein the reaction of the remaining solution with calcium hydroxide to recover the beneficiated mineral with calcium borate is carried out at a temperature between about 85° C. and about 98° C.

13. The process as claimed in claim 1, wherein the cooling stage for the precipitation of the boric acid crystals is carried out at a temperature between 23° C. and about 28° C.

* * * * *